Figure 1:
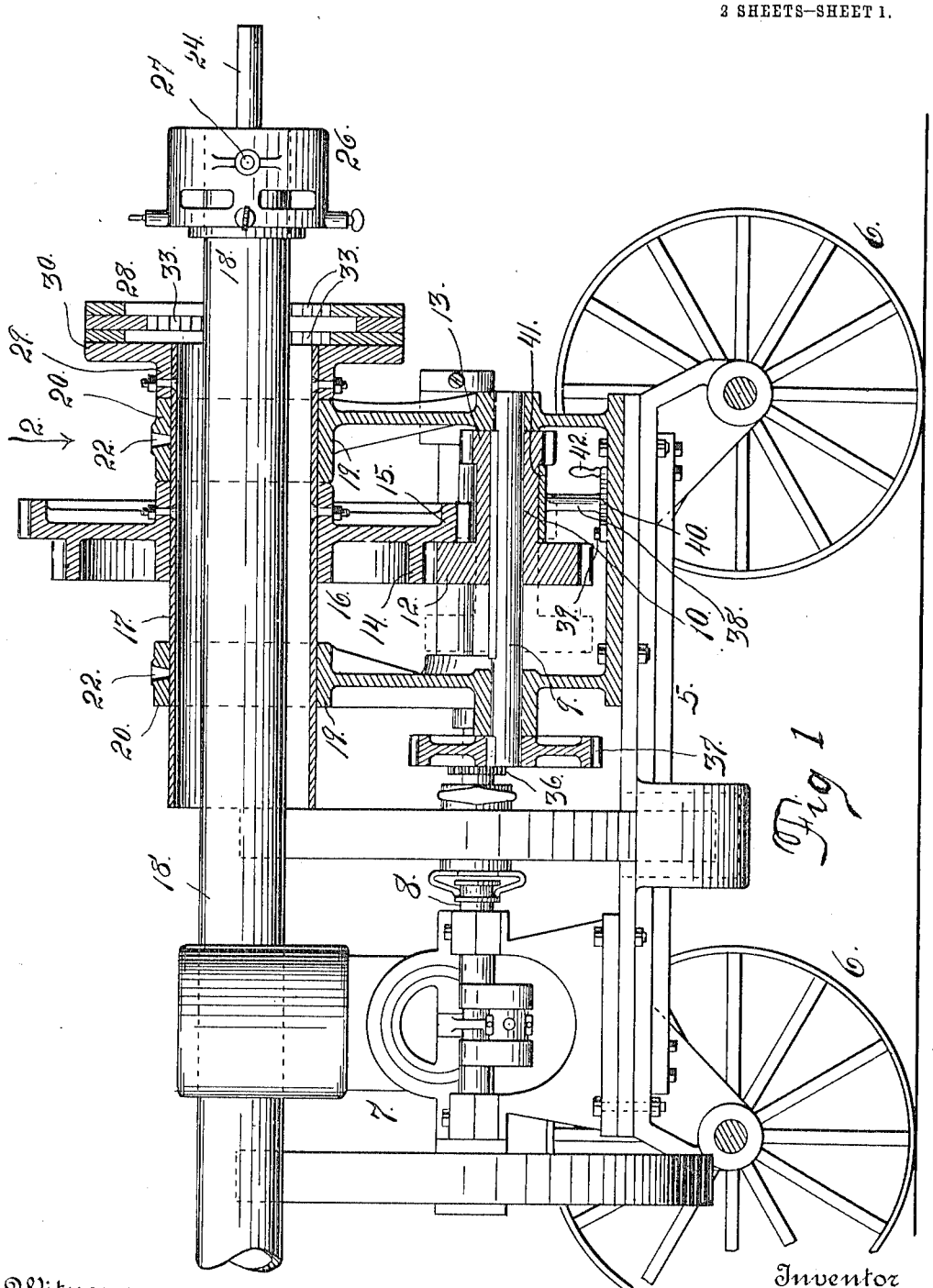

F. H. SAMPSON.
PIPE THREADING AND CUTTING MACHINE.
APPLICATION FILED AUG. 19, 1912.

1,081,916.

Patented Dec. 16, 1913.

2 SHEETS—SHEET 1.

Witnesses
Otto E. Hoddick.
C. H. Roessner.

Inventor
F. H. Sampson.
By N. J. O'Brien
Attorney

F. H. SAMPSON.
PIPE THREADING AND CUTTING MACHINE.
APPLICATION FILED AUG. 19, 1912.
1,081,916.
Patented Dec. 16, 1913.
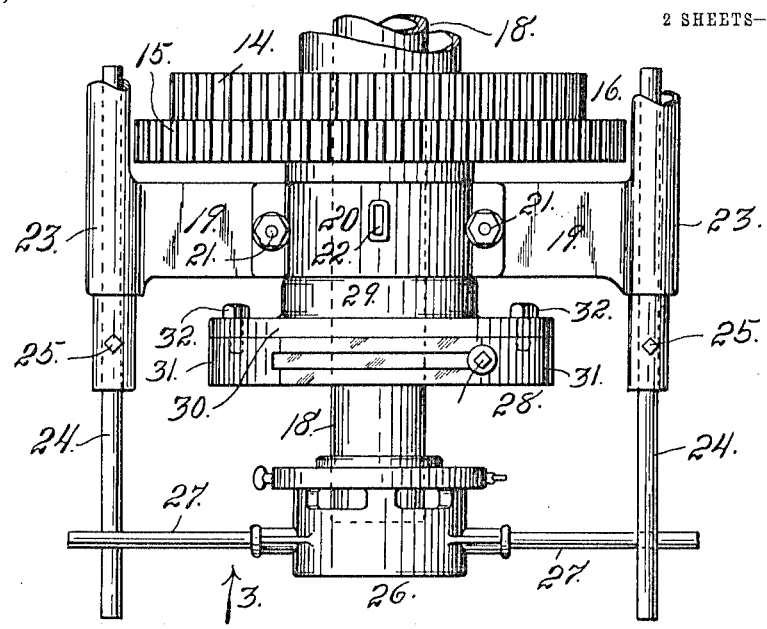
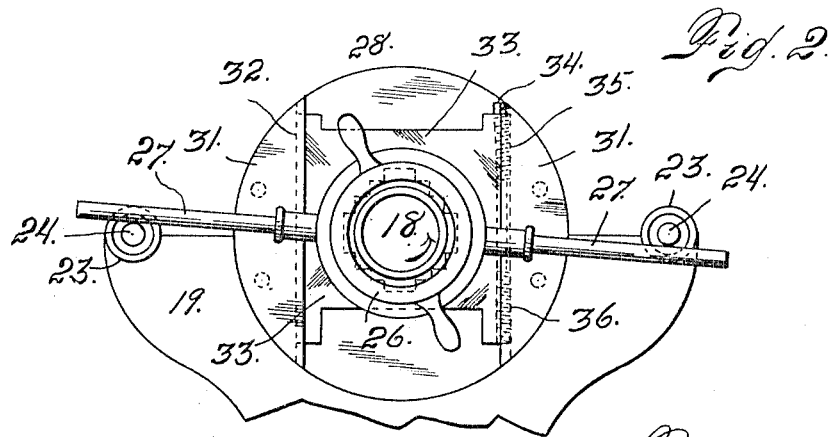
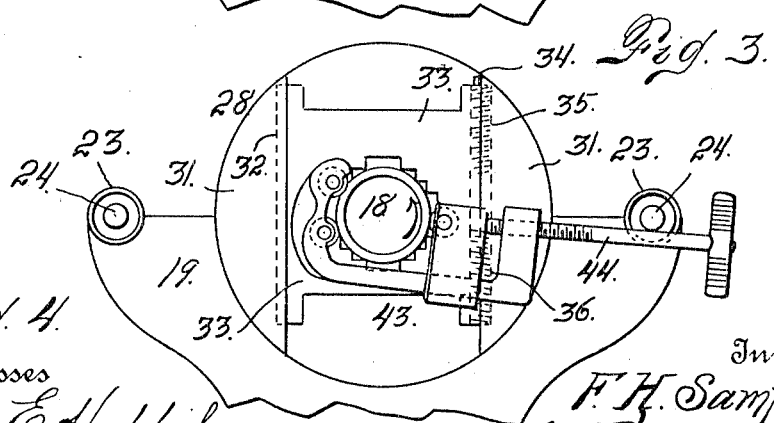
Witnesses
Otto E. Hoddick
C. H. Rosener
Inventor
F. H. Sampson
By A. J. O'Brien
Attorney

UNITED STATES PATENT OFFICE.

FREDERICK H. SAMPSON, OF DENVER, COLORADO.

PIPE THREADING AND CUTTING MACHINE.

1,081,916.  Specification of Letters Patent.  Patented Dec. 16, 1913.

Application filed August 19, 1912. Serial No. 715,716.

*To all whom it may concern:*

Be it known that I, FREDERICK H. SAMPSON, a citizen of the United States, residing in the city and county of Denver and State of Colorado, have invented certain new and useful Improvements in Pipe Threading and Cutting Machines; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in pipe-threading and cutting machines, my object being to provide a construction whereby it becomes practicable to employ the ordinary stock and die for cutting threads on pipes, in connection with a power machine, or a machine in which the pipe to be threaded is rotated from an engine or motor. With my improved machine I may also employ an ordinary pipe-cutter.

Heretofore, so far as I am aware, in machines of this character the thread-cutting die has been rigidly held by a stationary part of the machine, with the result that in case there is a slight bend or variation in the pipe's axis from a straight line, the threads may be cut more deeply on one side of the pipe than any other place. In other words, under such circumstances the depth of a thread is not uniform entirely around the pipe, since the die-holder cannot vary from its fixed position to correspond with a slight change in the direction of the pipe's axis.

With my improved construction, where the ordinary stock and die are employed, the arms of the stock are in engagement with two bars mounted on the machine and arranged on opposite sides of the pipe-holder. The arms of the stock engage these bars, one above and the other below, whereby the stock and die are prevented from rotating during the rotation of the pipe for thread-cutting purposes. By virtue of this construction and arrangement the arms of the stock are free to move upon the bars to correspond with a change in the direction of the pipe's axis, thus greatly reducing the friction incident to pipe-threading work by power machines, and whereby it becomes practicable to perform the pipe-threading operation in much less time than it can be accomplished by the use of the ordinary machine. By virtue of the fact that the stock and die employed in connection with my improved machine are so mounted as to permit lateral movement, as well as travel in the axial direction of the pipe, the pipe may be rotated much more rapidly without unduly heating the engaging parts than can be done where the die is absolutely stationary, as in the ordinary machine. The same advantage results from the use of my machine for pipe-cutting purposes. In this event only one of the bars need by employed, since the pipe-cutter has but a single arm.

My improvement is exceedingly simple in construction, and consists mainly in mounting a couple of bars on opposite sides of the machine, the same bars being longitudinally adjustable and arranged to engage the arms of the die stock or the arm of the pipe-cutter, as the case may be. In other respects the machine may be substantially the same as heretofore employed.

Having briefly outlined my improved construction, I will proceed to describe the same in detail, reference being made to the accompanying drawing, in which is illustrated an embodiment thereof.

In this drawing: Figure 1 is a side elevation, partly in section, of a machine equipped with my improvement, the stock and die being shown in place. Fig. 2 is a top-plan view looking in the direction of arrow 2, showing a portion of the machine. Fig. 3 is a view looking in the direction of arrow 3, Fig. 2. Fig. 4 is a similar view showing the construction with a pipe-cutter applied.

The same reference characters indicate the same parts in all the views.

Referring first, more particularly, to Figs. 1, 2 and 3, in which the stock and die are illustrated for pipe-cutting purposes, let the numeral 5 designate the frame-work of a machine mounted on wheels 6. Secured to the frame-work in any suitable manner is an engine 7 from whose shaft 8 power is transmitted by means of suitable gearing to a shaft 9 upon which is splined a gear 10 carrying two members 12 and 13 of varying diameters for speed-changing purposes. The members 12 and 13 of this gear are arranged to respectively engage members 14 and 15 of a large gear 16 made fast to the sleeve 17 through which the pipe 18 to be threaded, passes. When the pipe and sleeve are to be rotated at maximum speed the gear member 12 is in mesh with the gear member 14; while, when the pipe and sleeve are to be rotated at minimum speed, the gear member 13 is in mesh with the gear member 15. In order to change or vary the speed of rotation of the pipe and sleeve, it is only necessary to shift the gear 10 on its shaft 9 from the full line to the dotted line position in Fig. 1, or the reverse, as will be readily understood.

The sleeve 17 is mounted in bearings 19 and 20 formed on the frame-work and coöperating with bearing members 20 applied thereto from above and secured by fastening bolts 21,—see Fig. 2. The bearing parts 20 are provided with openings 22 at the top for the introduction of oil, or other suitable lubricating material.

Arranged on opposite sides of the machine are tubular members 23 in which are slidably mounted bars 24 which may be secured in any desired position of longitudinal adjustment by means of set-bolts 25. These bars are so spaced that when the stock and die 26 are applied to the pipe 18 to be threaded, the arms 27 of the stock will engage the said bars, one above and the other below, this arrangement being determined with reference to the direction of rotation of the pipe 18 during the thread-cutting operation.

The pipe 18, when arranged for thread-cutting purposes, is passed through the sleeve 17 which is made large enough for any pipe which it may be desired to use with the machine. Hence, in Fig. 1 of the drawing, this sleeve is shown considerably larger than the pipe 18. The pipe, however, is securely held in place to cause it to rotate with the sleeve 17, by means of a vise 28 which may be of any suitable construction. In the drawing, however, I have secured a collar 29 to the front end of the sleeve, the said collar having a flange 30 to which are secured segmental plates 31 by means of cap-screws 32 or other suitable fastening devices. These segmental plates are provided with grooves 32 adapted to receive clamping members 33 which are tightened upon the pipe by means of a screw 34 having right and left threads 35 and 36 engaging a threaded opening formed partly in the clamping members 33 and 34 and partly in one of the segmental plates 31. This screw is fashioned at one extremity to receive a socket key whereby it is adjustable for the purpose of tightening or loosening the clamping members upon the pipe.

As illustrated in the drawing, the engine shaft 8 is provided with a gear 36, which, it may be assumed, is in mesh with a gear 37 mounted on the shaft 9 to which motion is transmitted from the engine shaft. In machines of this character, a number of gears are employed and interposed between the gear 37 and the engine shaft, but as my present invention has nothing to do with this feature of the machine, I have not thought it necessary to illustrate the entire gearing construction.

The gear 10 may be shifted on the shaft 9 for varying the speed of the sleeve 17, in any suitable manner. As illustrated in the drawing, a lever 38 is employed, the same being fulcrumed on a bolt 39 and provided intermediate its extremities with a pin 40 to which is applied a plate 41 interposed between the two gear members 12 and 13. This lever is provided with a handle 42 for convenience of manipulation. By operating this lever, the gear 10 may be shifted in a manner that will be readily understood.

From the foregoing description, the use and operation of a machine equipped with my improvement, when employed for pipe-threading purposes, will be readily understood. Assuming that the pipe 18 is in place in the sleeve 17 and tightly clamped thereto by means of a vise 28, the stock and die 26 are put in place with one arm 27 of the stock above and the other below one of the bars 24, the end of the pipe 18 to be threaded being inserted in the die. Then as the machine is started and rotary motion is transmitted to the sleeve 17 and the pipe 18, the latter is turned for thread-cutting purposes, the die being drawn upon the pipe during the thread-cutting operation. In this event the bars 27 on the die stock slide upon the holding bars 24 both in the direction of the axis of the pipe and also laterally, as may be required.

When the machine is employed for pipe-cutting purposes, the cutter, which is designated by the numeral 43, may be applied to the pipe in the usual way, but with its arm 44 in operative relation with one of the bars 24, to prevent the pipe-cutter from turning. Then as the pipe is rotated, the cutting operation is quickly effected.

Having thus described my invention, what I claim is:

1. In a machine, a sleeve adapted to receive a pipe, means mounted on the sleeve for holding the pipe in place to rotate with the sleeve, a stock carrying a die adapted to be applied to the pipe, bars mounted on the machine arranged parallel with the pipe to be threaded, and separated to engage the arms of the die stock, said bars being longitudinally adjustable, substantially as described.

2. In a machine, a sleeve adapted to receive a pipe, means for rotating the sleeve, means mounted on the sleeve for holding the pipe in place to rotate with the sleeve, a stock carrying a die adapted to be applied to the pipe, tubular members carried by the machine and arranged parallel with said sleeve, bars freely slidable in the said tubes the bars when extended being arranged to respectively engage the arms of the die stock for the purpose set forth.

3. In a machine, a sleeve adapted to receive a pipe, means mounted in the sleeve for holding the pipe in place to rotate with the sleeve, a tool adapted to be applied to the pipe, a bar mounted on the machine parallel with the sleeve and when in operative position adapted to engage said tool, said bar being adapted to be slid longitudinally into the machine away from engagement with the tool, substantially as described.

In testimony whereof I affix my signature in presence of two witnesses.

FREDERICK H. SAMPSON.

Witnesses:
A. J. O'BRIEN,
MAY CLEMENTS.